US012074874B2

(12) United States Patent
Taylor

(10) Patent No.: US 12,074,874 B2
(45) Date of Patent: Aug. 27, 2024

(54) HIGH-FIDELITY DATA MANAGEMENT FOR CROSS DOMAIN ANALYTICS

(71) Applicant: National Association of Convenience Stores, Alexandria, VA (US)

(72) Inventor: Gray Taylor, Georgetown, TX (US)

(73) Assignee: National Association of Convenience Stores, Alexandria, VA (US)

( * ) Notice: Subject to any disclaimer, the term of this patent is extended or adjusted under 35 U.S.C. 154(b) by 185 days.

(21) Appl. No.: 17/550,545

(22) Filed: Dec. 14, 2021

(65) Prior Publication Data

US 2022/0191208 A1 Jun. 16, 2022

Related U.S. Application Data

(60) Provisional application No. 63/126,420, filed on Dec. 16, 2020.

(51) Int. Cl.
*H04L 9/40* (2022.01)
*G06F 9/54* (2006.01)
*G06F 16/9535* (2019.01)
*G06N 20/00* (2019.01)

(52) U.S. Cl.
CPC ............ *H04L 63/101* (2013.01); *G06F 9/547* (2013.01); *G06F 16/9535* (2019.01); *G06N 20/00* (2019.01); *H04L 63/102* (2013.01)

(58) Field of Classification Search
CPC ..... H04L 63/101; H04L 63/10; H04L 63/102; G06N 20/00; G06F 16/9535; G06F 9/547
See application file for complete search history.

(56) References Cited

U.S. PATENT DOCUMENTS

| | | | |
|---|---|---|---|
| 8,521,754 B2 | 8/2013 | Trevor et al. | |
| 9,104,748 B2 | 8/2015 | Solheim et al. | |
| 9,390,382 B2 * | 7/2016 | Singer | G06N 20/00 |
| 9,489,625 B2 * | 11/2016 | Kalns | G06N 5/02 |
| 9,582,300 B2 | 2/2017 | Martori et al. | |

(Continued)

FOREIGN PATENT DOCUMENTS

EP 3063652 A1 9/2016

OTHER PUBLICATIONS

International Patent Application No. PCT/US2021/063561, Search Report mailed Apr. 2, 2022, 3 pages.

(Continued)

*Primary Examiner* — Hosuk Song

(57) ABSTRACT

Systems for providing high-fidelity data management for cross domain analytics may include multiple components. An access management function component may control access to data stored in a data store of a business domain by a user account associated with a search engine domain. A data management function component may select based on at least one of one or more data access privileges for the user account associated with the search engine domain or one or more privacy policies, a data view of multiple data views for viewing the data, and one or more data filters for application to the data. An external API manager component may store in the data store of the business domain cross correlation information that correlates a plurality of machine learning model identifiers of machine learning models of the search engine domain with one or more corresponding business APIs of the business domain.

20 Claims, 7 Drawing Sheets

(56) References Cited

U.S. PATENT DOCUMENTS

| | | | |
|---|---|---|---|
| 9,729,506 B2 | 8/2017 | Call et al. | |
| 11,070,488 B2* | 7/2021 | You | H04L 47/785 |
| 11,227,184 B1* | 1/2022 | Freese | G06F 16/242 |
| 11,288,456 B2* | 3/2022 | Batra | G06N 5/01 |
| 11,604,994 B2* | 3/2023 | Zhu | G06F 18/24317 |
| 11,783,126 B2* | 10/2023 | Galitsky | G06N 3/006 |
| | | | 704/9 |
| 2020/0410166 A1* | 12/2020 | Galitsky | G06F 40/289 |
| 2022/0067365 A1* | 3/2022 | Agrawal | G06F 40/289 |

OTHER PUBLICATIONS

International Patent Application No. PCT/US2021/063561, Written Opinion mailed Apr. 2, 2022, 4 pages.

* cited by examiner

HIGH-FIDELITY DATA MANAGEMENT FOR CROSS DOMAIN ANALYTICS

CROSS-REFERENCE TO RELATED PATENT APPLICATION

This application claims priority to U.S. Provisional Patent Application No. 63/126,420, filed on Dec. 16, 2020, entitled "High Fidelity Metadata Management" which is hereby incorporated by reference in its entirety.

BACKGROUND

Presently, analytics in the form of machine learning and cognitive networks are commonly used for predictive computation. In the case of search engines, machine learning models are used to send prioritized search results (called "surfacing results" in computer science parlance) to users and other requestors. In the case of businesses, data is collected to make predictions for operations. For example, in inventory management, machine learning models are used to predict when to replenish stock and to predict consumer demand.

Businesses have an interest in being surfaced by search engines and search engines conversely have an interest in providing search result consumers with accurate results. However, businesses store much metadata and contextual data that search engines do not have access to and search engine platforms provide much data and functionality that business stores do not necessarily take advantage of. Accordingly, there is a need to mediate information transfer, and in particular data transfer for the mutual benefit of businesses and search engine platforms alike.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
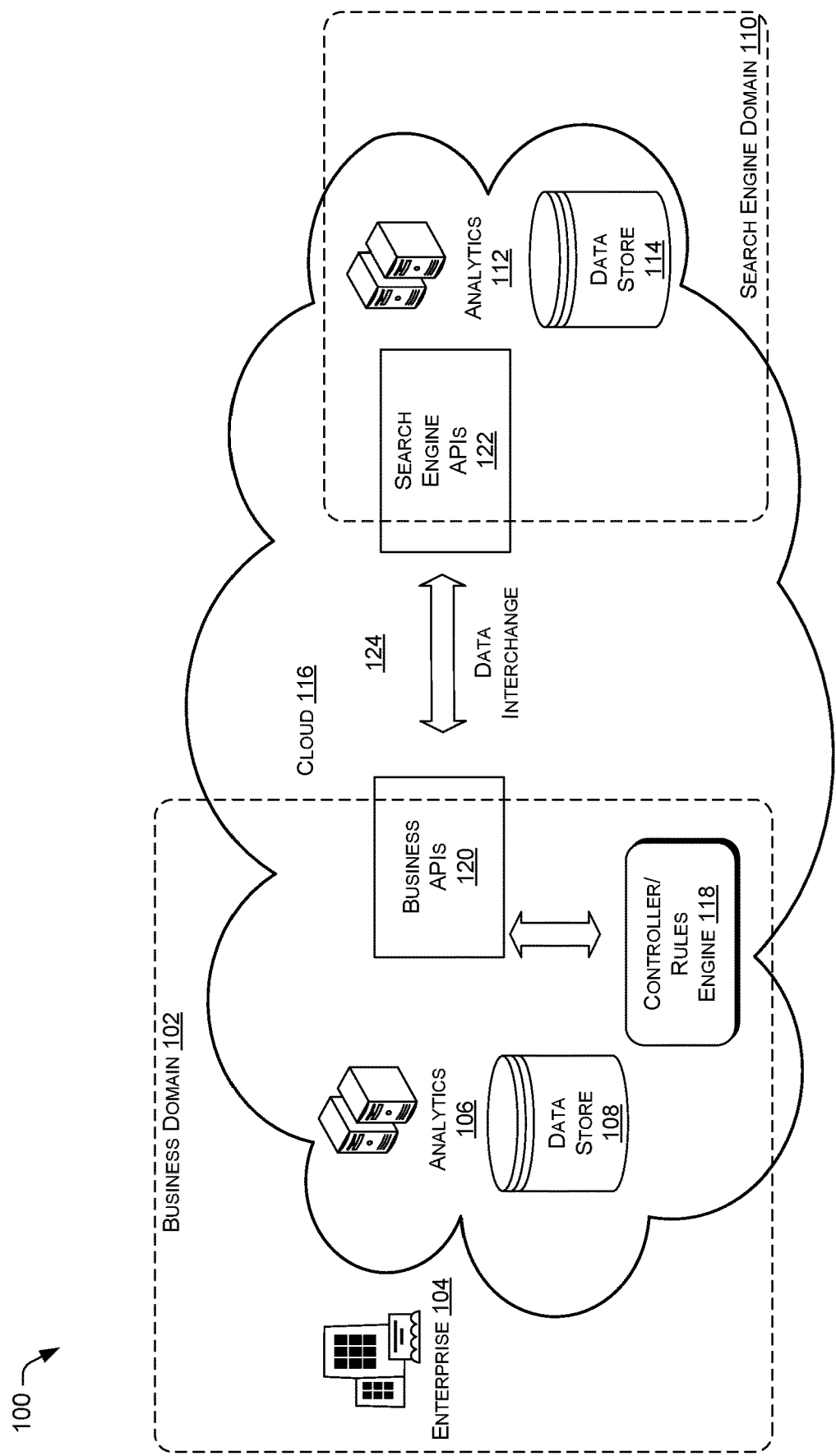
FIG. 1 is an example configuration for implementing example embodiments of high-fidelity data management.

This disclosure is directed to techniques for performing high-fidelity management of data that is analyzed by machine learning models in the context of businesses and search engines. Machine learning models, which for purposes of this disclosure include cognitive networks, are summaries of data sets called training data sets. Specifically, a training data set is comprised of data that is representative of a statistically significant number of observations of interest. The training data set is then placed into a series of neural networks that capture the statistical behavior of selected attributes of those observations, called a machine learning model. The machine learning model is much smaller than the training data set and can be used to predict new behavior based on new observations called input data. Specifically, the input data is received, and attribute values corresponding to attribute values in the machine learning model are extracted. Those attributes are then input into the machine learning model, and the value of predicted attributes are then output. Depending on the statistics used, confidence levels can also be calculated and output as well.

Consider an example where a statistically large number of pictures of dogs and cats are collected into a training data set, for purposes of creating a machine learning model to identify whether an image constituting new input data contains a dog or a cat. The training data set is input into a machine learning model generator and the machine learning model is created. The generator may have been programmed to look for specific attributes such as the shape of the snout, the distance between the eyes, and the like. When the generated machine learning model receives and scans a new input data picture, it extracts those attributes, and then the machine learning model generates a probability that a dog or a cat is in the picture. For example, the machine learning model may say that there is an 85% confidence that the input data image is that of a dog.

Businesses make use of analytic applications, also referred to as analytics, for similar reasons. Based on historical data, they make projections for inventory, customer volume, revenue, and the like. Similarly, search engines make use of analytics to improve the accuracy and relevance of search results. However, search engines suffer from not having the most accurate data available about businesses—that is the data owned by the businesses themselves.

By way of example, a search engine can tell whether a user clicked on a link, but the search engine cannot tell whether a customer in fact went to a store and made a purchase—that is information held by the business itself. Similarly, a business cannot tell the volume of interest in its offerings, but data from the search engine would provide this information.

Presently, search engines expose applications programming interfaces ("APIs") to provide businesses information, and to provide the means of performing search engine optimization ("SEO"). However, presently, while some businesses expose business data via APIs, there is no automation to manage the potential to combine business-owned data and search engine-owned data.

A controller may be used to advantageously manage the combination of data from both the business and the search engine. The controller may include a rules engine, may be implemented as the rules engine, or may be substituted with the rules engine. In various embodiments, the data may include metadata, operational data, and/or contextual data, in which the data may be related to businesses and/or search engines. A first advantage is the management of privacy and security. The laws around privacy and security are constantly in flux and becoming increasingly restricted. As a result, not all business data may be exposed.

A second advantage of the controller is to ensure that machine learning models are developed that improve statistical confidence, rather than defeat the predictive value. The introduction of additional attributes might improve the accuracy of a machine learning model, but only if there is a bona fide correlation between the additional attributes and the predictions. In our dog and cat example earlier, it is possible to program the machine learning model to look at the background color of an image. Barring the unusual, there should be no correlation between the background color of an image and whether the image contains a dog or cat. Accordingly, introducing background color as an attribute would either provide a neutral predictive value or worse would degrade the predictive value of the machine learning model.

Accordingly, a controller can introduce and/or provide the logic necessary to ensure that data received from the search engine APIs and the data shared by the business via their APIs, improve the predictive value of machine learning models. When the data introduced to a machine learning model improves the predictive value, the data model is said to "positively converge" or simply to "converge".

A third advantage is that a controller has the capability of monitoring what data is shared via the business APIs and quantifying the benefits of the improved machine learning models and data models in general to the business. Accordingly, if a controller exists as a third-party service, the controller may act as a billing and audit model to monetize the services provided by the controller. In this way, such a controller could be the basis for a platform for managing data between a business and a search engine.

Example Configuration for High-Fidelity Data Management

FIG. 1 is an example configuration 100 for implementing example embodiments of high-fidelity data management. In various embodiments, such high-fidelity data management may be performed in the context of domains, in which a domain includes the computing assets for an entity. Those assets may exist in the cloud, or outside of the cloud. A business domain 102 is the set of computing assets for an enterprise 104. The enterprise 104 may have some computing assets dedicated to analytics 106 and data store 108 containing its operational data, metadata, etc. Generally, the data in data store 108 provides training data for data models used by analytics 106. Search engine platforms are also businesses and accordingly have their own domains, such as the search engine domain 110. Similarly, search engines may have their own analytics 112 and data stores 114.

Because of the volume of data and the computations requirements for generating data models, it is typical that the analytics 106 and 112 and data stores 108 and 114 reside on the cloud 116. The cloud 116 is generally a set of servers that are disaggregated by a hypervisor that serves up computing and storage on demand in the form of virtual machines. The cloud 116 is described in greater detail with respect to FIG. 2.

Businesses, such as that encapsulated in the business domain 102 and the search engine domain 110 may expose their data and receive data through APIs. In the case of a business domain 102 that wishes to cooperate with a search engine domain 110, the business domain may use a controller 118. In various embodiments, the controller 118 may include a rules engine, be implemented as a rules engine, or be substituted with a rules engine. The controller 118 controls what data and functionality are exposed by controlling the behavior of the business APIs 120. The controller 118 also controls what search engine APIs 122 are invoked. The controller 118 is described in further detail with respect to FIG. 3. Accordingly, the controller 118 provides a fully functional two-way data interchange 124, not just data exchange or functional invocation solely through the search engine APIs 122, with the data interchange 124 conforming to the business logic of the enterprise 104.

Example Environment for High-Fidelity Data Management

Figure 2:
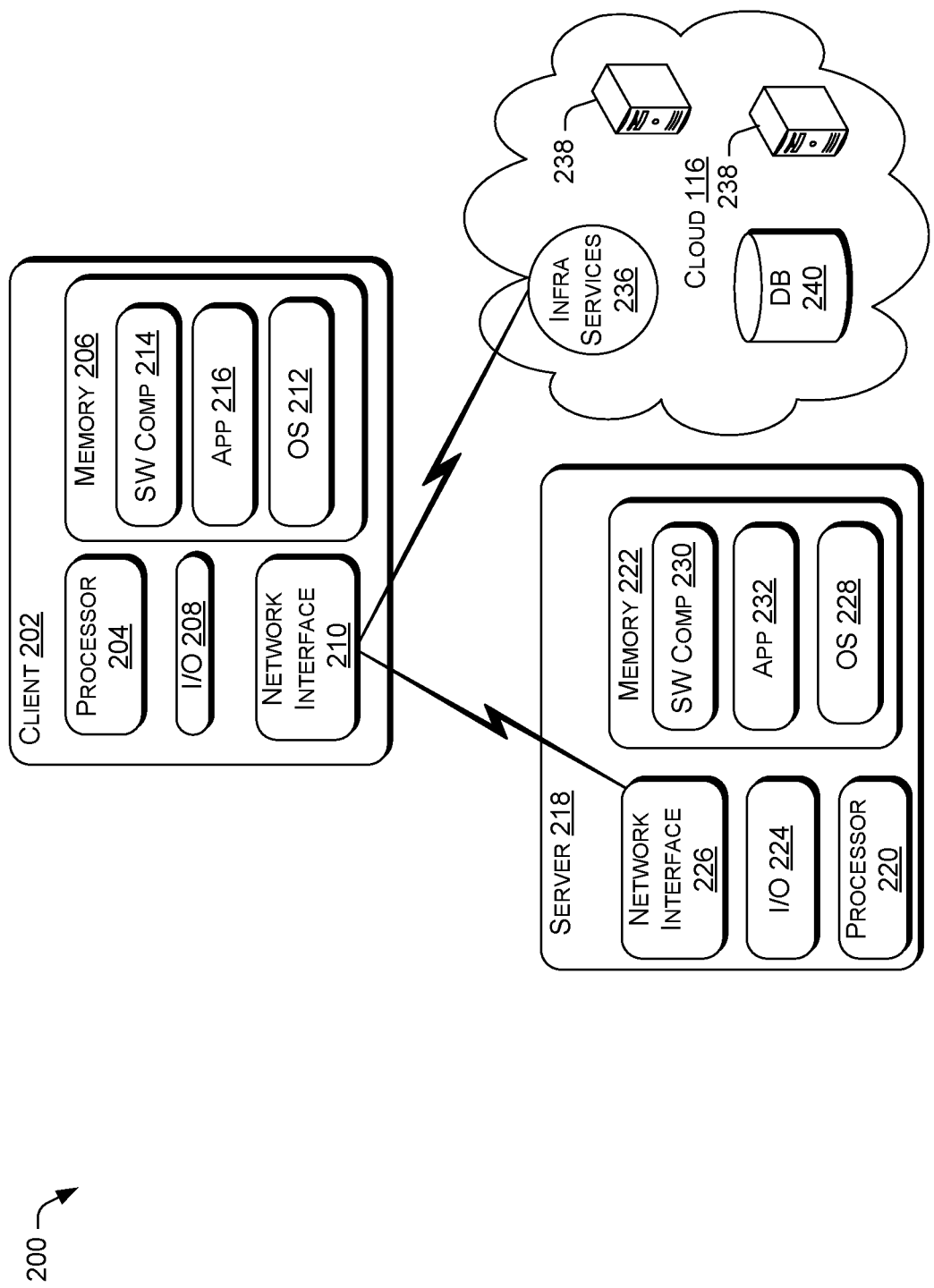
FIG. 2 is a block diagram of an example environment that includes hardware, software, and communications environment for implementing high-fidelity data management.

FIG. 2 is a block diagram of an example environment 200 that includes hardware, software, and communications environment for implementing high-fidelity data management. The functionalities for performing high-fidelity data management are generally hosted on computing devices. Example computing devices include without limitation on the client-side: mobile devices (including smartphones), tablet computers, laptops, desktop personal computers, onboard vehicle navigation devices, and kiosks. Example computing devices on the server-side include without limitation: mainframes, physical servers, and virtual machines. Generally, the computing devices are networked.

A client-side computing device, or client 202, may have a processor 204, a memory 206. The processor may be a central processing unit, a repurposed graphical processing unit, and/or a dedicated controller such as a microcontroller. The computing device may further include an input/output (I/O) interface 208, and/or a network interface 210. The I/O interface 208 may be any controller card, such as a universal asynchronous receiver/transmitter (UART) used in conjunction with a standard I/O interface protocol such as RS-232 and/or Universal Serial Bus (USB). The network interface 210, may potentially work in concert with the I/O interface 208 and may be a network interface card supporting Ethernet and/or Wi-Fi and/or any number of other physical and/or datalink protocols. Alternatively, the network interface 210 may be an interface to a cellular radio.

Memory 206 is any computer-readable media that may store several software components including an operating system 212 and software components 214 and/or other applications 216 including an internet browser or application integrating internet browsing capability. In general, a software component is a set of computer-executable instructions stored together as a discrete whole. Operating system 212 and applications 216 are themselves software components or integrated aggregations of software components. Examples of software components 214 include binary executables such as static libraries, dynamically linked libraries, and executable programs. Other examples of software components 214 include interpreted executables that are executed on a run time such as servlets, applets, p-Code binaries, and Java binaries. Software components 214 may run in kernel mode and/or user mode.

Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), Blu-Ray, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. As defined herein, computer storage media does not include communication media.

The server-side computing device, or server 218, is any computing device that may participate in a network. The network may be, without limitation, a local area network ("LAN"), a virtual private network ("VPN"), a cellular network, or the Internet. The server 218 has hardware components analogous to the client-side computing device, i.e., client 202. Specifically, it will include a processor 220, a memory 222, an input/output interface 224, and/or a network interface 226. The memory 222 may implement an operating system 228, server-side software components 230, and server-side applications 232. Server 218 differs from client 202 in that processing power is generally more powerful to handle concurrent processes running and network capacity is greater to communicate with multiple clients 202. Server-side software components 230 may include libraries and run-times (e.g., to run interpreted code). Server-side applications 232 may include not only web servers (also called "application servers") and database servers, but also server software providing functionality not typically found in legacy system applications. Example server software may include transaction monitors, single sign-on servers, identity servers, security servers (including access control list (ACL) functionality) and network session managers (which enable multiple concurrent sessions on a legacy system application).

In general, high-fidelity data management may be implemented as a software service on a physical server 218. However, such a software service may also be hosted on the cloud 116 via a cloud service 236. Specifically, the cloud service 236 is comprised of multiple physical computer servers that are disaggregated via a hypervisor. The physical computer servers each may have one or more processors, memory, at least an I/O interface, and/or a network interface. The features and variations of the processors, memory, the I/O interface, and the network interface are substantially similar to those described for the physical server 218 described above.

A cloud service 236 includes a hypervisor that can delegate calls to any portion of hardware in the underlying physical serves, and upon request generates a virtual machine from the separate portions of hardware, regardless of a physical server (a process called "disaggregation"). Just as a physical server 218, a virtual machine may host not only software applications, components including services, but also virtual web servers 238 functionality and virtual storage/data store 240 functionality.

The virtual machines themselves may be further partitioned into containers, which enable the execution of a program in an independent subset of the virtual machine. Software such as Kubernetes, Mesos, and Docker are examples of container management software. Unlike virtual machines which have a delay in startup due to the need for provisioning an entire OS, containers may be generated more quickly and on-demand since the underlying virtual machine is already provisioned.

The cloud service 236 may embody an abstraction of services. Common examples include service abstractions such as Platform as a Service ("PAAS"), Infrastructure as a Service ("IAAS"), and Software as a Service ("SAAS").

A Controller for Data Management and Exchange

Figure 3:
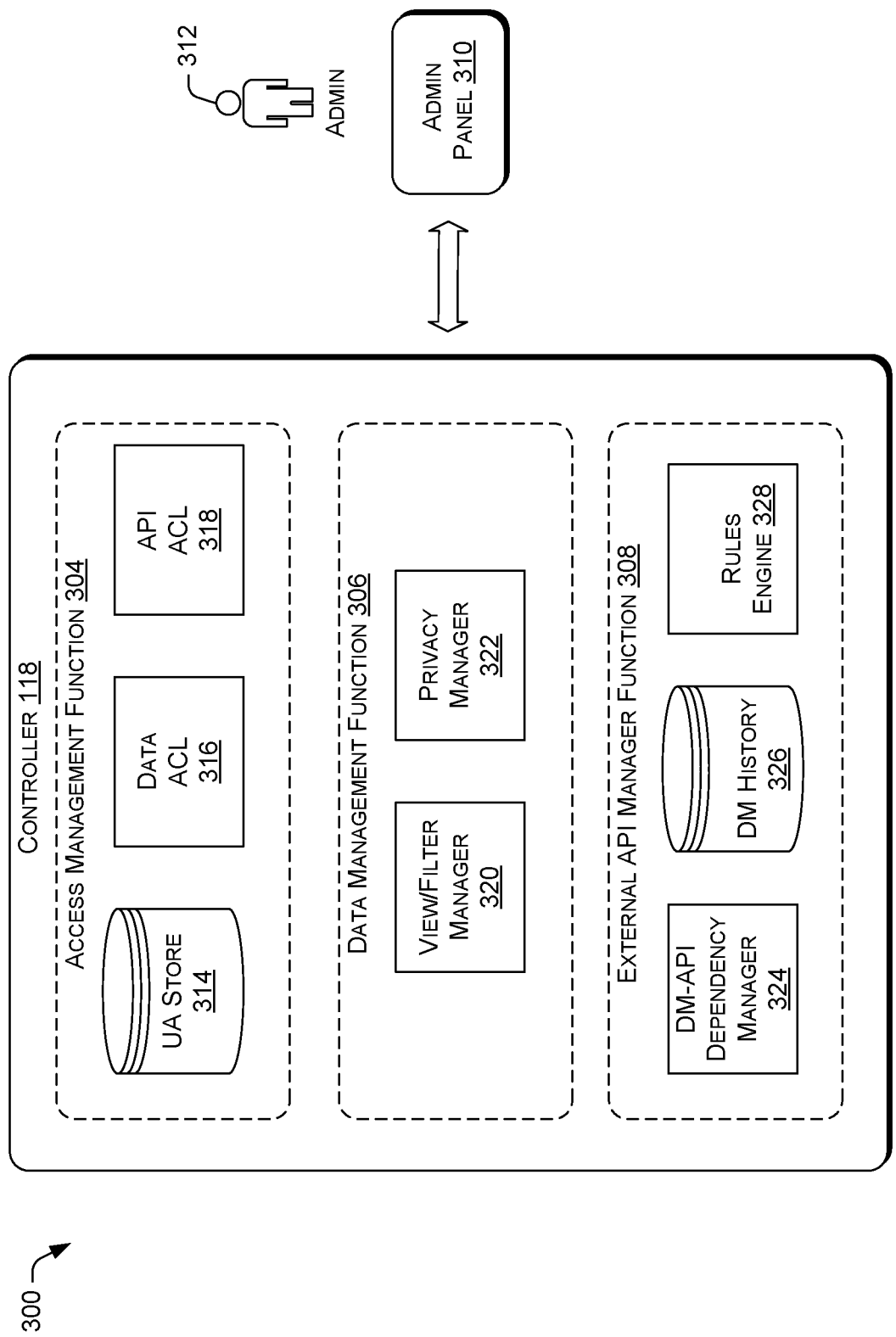
FIG. 3 is a block diagram of an example controller for controlling the data interchange between business APIs and search engine APIs.

FIG. 3 is a block diagram 300 of an example controller 118 for controlling the data interchange 124 between business APIs 120 and search engine APIs 122. The controller 118 manages several functions and sub-functions (herein "managers", "data stores", "ACLs", "rules engines" and equivalents) comprised of software components implemented via computer-executable instructions and/or computer-readable data. Specifically, it has an access management function 304, a data management function 306, an external API manager function 308, and an administration panel 310 for an administrator 312. The functions 304-308 and the administration panel 310 may be implemented via routines, program instructions, objects, and/or data structures that are executed in the environment 200 to perform particular tasks or implement particular abstract data types.

The access management function 304 is responsible for determining access to particular APIs and access to data within the business domain 102. It is comprised of a user account data store 314 to store accounts with access to data and/or APIs within the business domain 102. In alternative instances, the access management function 304 may not perform key and account management directly. Instead, the access management function 304 may delegate such functions to other security infrastructure within the business domain 102. The user account data store 314 at a minimum includes the identifiers for unique accounts to access APIs and/or data.

Access control lists indicate what privileges are associated with each specific account. Accordingly, the access management function 304 includes a data access control list 316 and an API access control list. The data access control list 316 specifies database and data access privileges with respect to data store 108 within the business domain 102. These may be implemented as SQL granted privileges within a relational database management system or equivalents for the data store 108 within the business domain 102. The API access control list 318 stores the privileges for user accounts in the user account data store 314 to access the business APIs 120.

The data management function 306 determines the behavior of the business APIs 120 when accessed by a user account in user account data store 314. Specifically, when a request to access data, generally via a business API 120 is received, the data management function 306 identifies the accessing user and associated privileges via the access management function 304. Based on the received privileges, the view and filter manager 320 identifies a particular version of data views that may be accessed and additional data filters to apply. The view and filter manager 320 maps versions of views and filters to apply to user accounts.

In the case of managing views with respect to a relational database, a set of data may expose a limited set of fields by defining a SQL view. Some views may have a large number of fields, and other views may restrict fields. Depending on the account accessing a business API 120, the view and filter manager 320 selects which version of the views is to be accessed.

Furthermore, in a relational database, a SQL view may have additional filters and conditions set on the data thereby limiting the number of data rows returned. Accordingly, depending on the account accessing a business API 120, the view and filter manager 320 selects which filters to apply to the view.

In practice, the view and filter manager 320, upon receiving an API request and identifying the accessing account, apply both view and filter management in combination before enabling a return of a result set via the API. In this way, the view and filter manager 320 can manage what fields and database records are shared from the same API 120.

The view and filter manager 320 acts in concert with the privacy manager 322. The privacy manager 322 interfaces with external automated privacy policies or may store automated privacy policies itself. Specifically, access to data and APIs via the data access control list 316 and the API access control list 318, as well as the application/selection of views and filters in the view and filter manager 320 are changed upon the recommendation of the privacy manager 322. The recommendations are surfaced to the administrator 312 via the administration panel 310. The administrator 312 may select which changes to perform based on the privacy manager 322 recommendations. Alternatively, the administration panel 310 may be set to automatically accept all privacy manager 322 recommendations. In this way, privacy and cybersecurity remediation may be fully automated The controller 118 also exists to ensure that machine learning models (e.g., data models, also referred to as "DM") dependent on external APIs have data that converge to improving predictive capabilities. The DM-API dependency manager 324 of the external API manager function 308 may store a series of identifiers of internal machine learning models from the analytics 106 within the business domain 102 cross-correlated with external search engine APIs 122. Similarly, the DM-API dependency manager 324 of the external API manager function 308 may also store identifiers machine learning models from the analytics 112 of the search engine domain 110 as well, where the search engine domain 110 has configured the sharing of machine learning model information, cross-correlated with the business APIs 120. This allows the external API manager function 308 to track which machine learning models have dependencies on which APIs.

The data model history data store 326 stores the historical performance of data models. Specifically, it stores the predicted statistical confidence in the data models and, in some cases, the actual predictive performance of the data models. The rules engine 328, reviews the history, and based on predetermined thresholds set by the administrator 312 via the administrator panel 310, or based on machine learning models itself, makes recommendations for what changes to APIs access should be made. Specifically, the recommendations from the rules engine 328 may specify access to additional APIs, removal of APIs as not contributing to the predictive value of the model, or may recommend changes to views and filters applied. These results are presented to the administrator 312 via the administrative panel 310. Upon approval of the administrator 312, the access management function 304 and/or the data management functions 306 may perform all, or part of, the recommendations of the rules engine 328. In some instances, the administrative panel 310 may be configured to automatically accept recommendations from the rules engine 328. In this way, modifications of data and APIs may be fully automated.

Example Processes

FIGS. 4 and 5 present illustrative processes 400 and 500 for implementing the remote triggering of personal devices to perform actions in response to detected events. Each of the processes 400 and 500 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400 and 500 are described with reference to the configuration 100 of FIG. 1 and the environment 200 of FIG. 2.

Figure 4A:
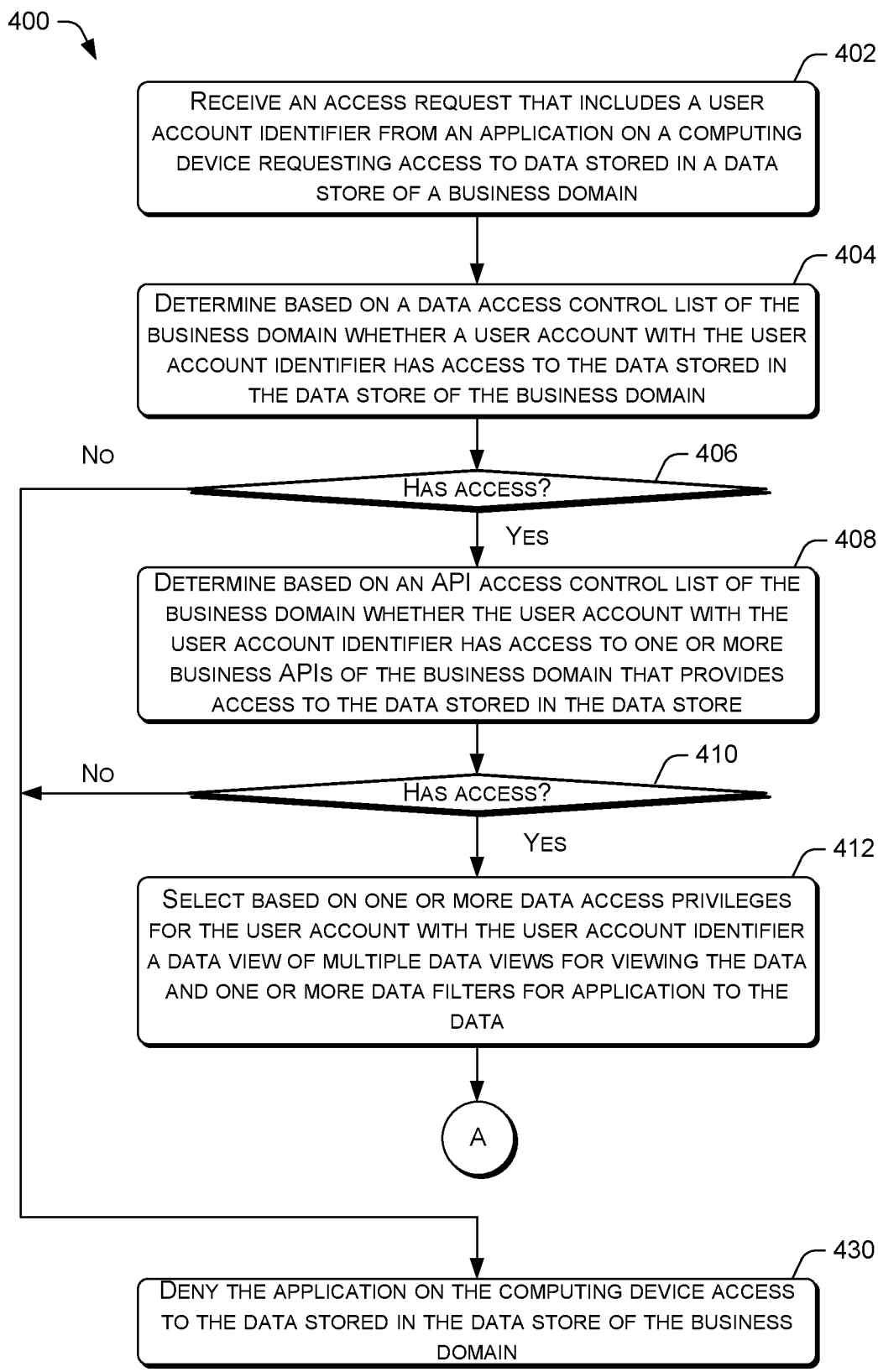
FIGS. 4a and 4b illustrate a flow diagram of an example process used by a controller to manage data access to data stored in a data store of a business domain in accordance.
Figure 4B:
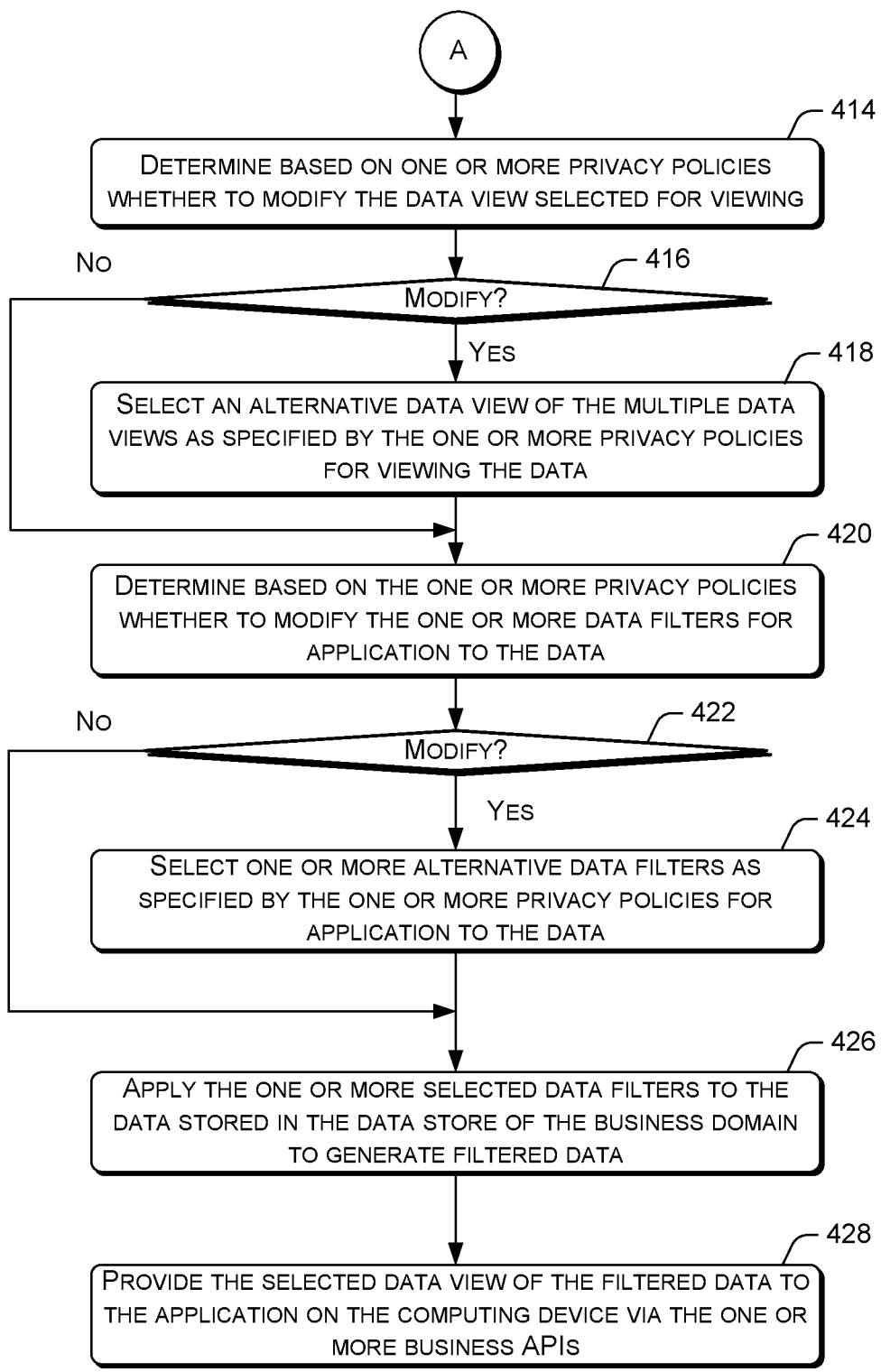

FIGS. 4a and 4b illustrate a flow diagram of an example process 400 used by a controller to manage data access to data stored in a data store of a business domain in accordance. At block 402, the controller 118 may receive an access request that includes a user account identifier from an application on a computing device, in which the access request is requesting access to data stored in a data store of a business domain. At block 404, the controller 118 may determine based on a data access control list of the business domain whether a user account with the user account identifier has access to the data stored in the data store of the business domain.

At decision block 406, if the controller 118 determines that the user account with the user account identifier has access to the data ("yes" at decision block 406), the process 400 may proceed to block 408. At block 408, the controller 118 may determine based on an API access control list of the business domain whether the user account with the user account identifier has access to one or more business APIs of the business domain that provides access to the data stored in the data store.

At decision block 410, if the controller 118 determines based on the API access control list of the business domain that the user account with the user account identifier has access to one or more business APIs ("yes" at decision block 410), the process 400 may proceed to block 412. At block 412, the controller 118 may select based on one or more data access privileges for the user account with the user account access identifier a data view of multiple views for viewing the data and one or more data filters for application to the data. In some embodiments, the data access privileges for the user account with the user account access identifier may be stored in the data access control list.

At block 414, the controller 118 may determine based on one or more privacy policies whether to modify the data view selected for viewing. In various embodiments, the one or more privacy policies may be stored in an internal database of the controller 118 or an external database. At decision block 416, if the controller 118 determines that the data view selected for viewing is to be modified ("yes" at decision block 416), the process 400 may proceed to block 418. At block 418, controller 118 may select an alternative view of the multiple data views as specified by the one or more privacy policies for viewing the data. In various embodiments, the selection may be made automatically by the controller 118 or in response to an input made by an administrator via an administrative interface of the controller 118.

At block 420, the controller 118 may determine based on the one or more privacy policies whether to modify the one or more data filters for application to the data. At decision block 422, if the controller 118 determines that the one or more data filters are to be modified ("yes" at decision block 422), the process 400 may proceed to block 424. At block 424, the controller 118 may select one or more alternative data filters as specified by the one or more privacy policies for application to the data. In various embodiments, the selection may be made automatically by the controller 118 or in response to an input made by an administrator via an administrative interface of the controller 118.

At block 426, the controller 118 may apply the one or more selected data filters to the data stored in the data store of the business domain to generate filtered data. At block 428, the controller 118 may provide the selected data view of the filtered data to the application on the computing device via the one or more business APIs. For example, the controller 118 may permit the application on the computing device to access the selected view of the filtered data via the one or more business APIs.

Returning to decision block 406, if the controller 118 determines that the user account with the user account identifier does not have access to the data ("no" at decision block 406), the process 400 may proceed to block 430. At block 430, the controller 118 may deny the application on the computing device access to the data stored in the data store of the business domain. Returning to decision block 410, if the controller 118 determines based on the API access control list of the business domain that the user account with the user account identifier does not have access to one or more business APIs ("no" at decision block 410), the process 400 may also proceed to block 430.

Figure 5A:
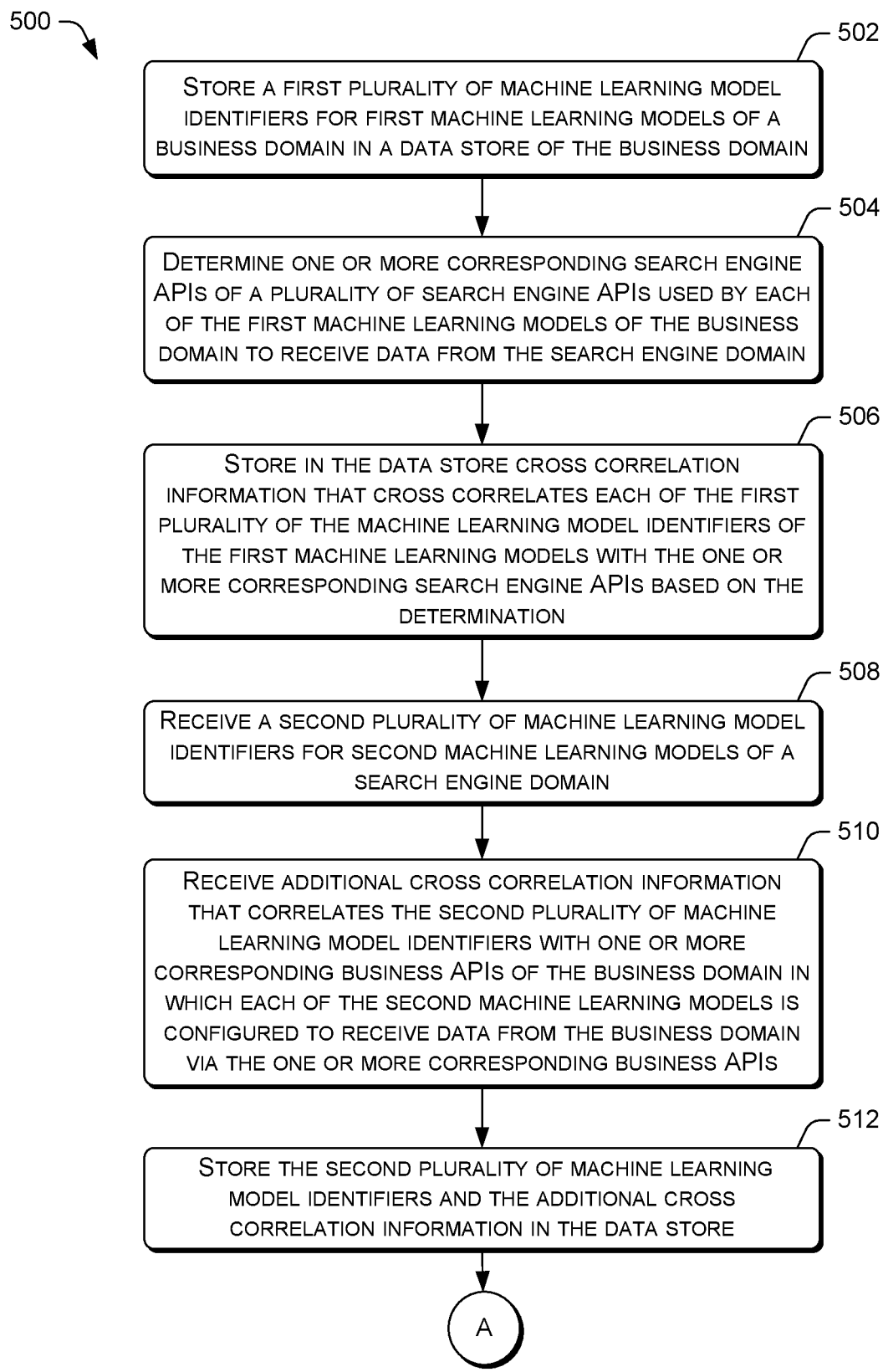
FIGS. 5a and 5b illustrate a flow diagram of an example process for controlling the data interchange between business APIs and search engine APIs.
Figure 5B:
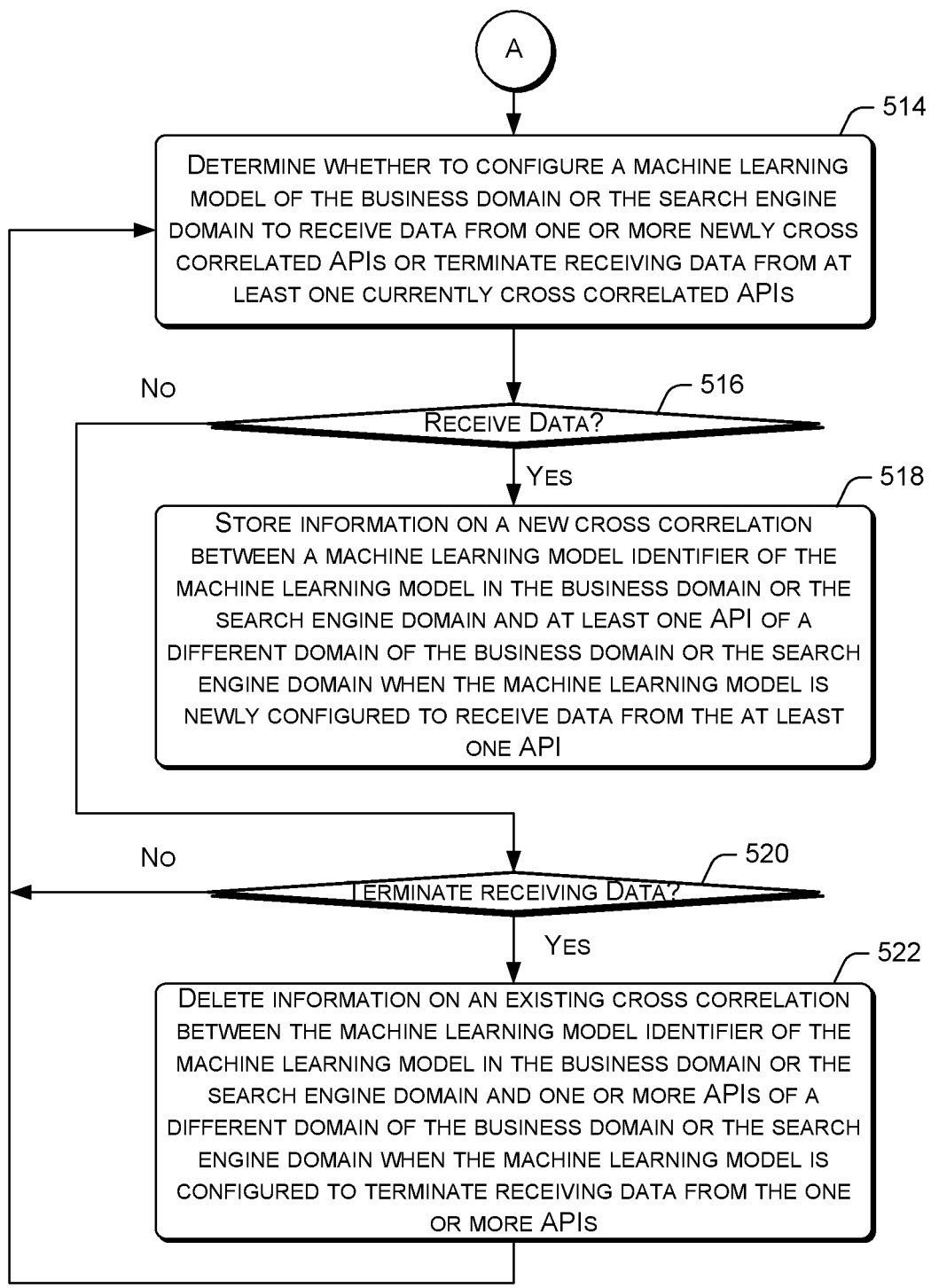

FIGS. 5a and 5b illustrate a flow diagram of an example process 500 for controlling the data interchange between business APIs and search engine APIs. At block 502, the controller 118 may store a first plurality of machine learning model identifiers for first machine learning models of a business domain, such as the business domain 102, in a data store of the business domain. At block 504, the controller 118 may determine one or more corresponding search engine APIs of a plurality of search engine APIs used by each of the first machine learning models of the business domain to receive data from the search engine domain. For example, the controller 118 may make the determination based on information the controller 118 obtained from the analytics 106.

At block 506, the controller 118 may store in the data store cross correlation information that cross correlates each of the first plurality of the machine learning model identifiers of the first machine learning models with the one or more corresponding search engine APIs based on the determination.

At block 508, the controller 118 may receive a second plurality of machine learning mode identifiers for second machine learning models of a search engine domain, such as the search engine domain 110. In various embodiments, the controller 118 may receive such identifiers from the search domain. At block 510, the controller 118 may receive additional cross correlation information that correlates the second plurality of machine learning model identifiers with one or more corresponding business APIs of the business domain in which each of the second machine learning models is configured to receive data from the business domain via the one or more corresponding business APIs. In various embodiments, the controller 118 may receive such information from the search domain. At block 512, the controller 118 may store the second plurality of machine learning model identifiers and the additional cross correlation information in the data store.

At block 514, the controller 118 may determine whether to configure a machine learning model of the business domain or the search engine domain to receive data from one or more newly cross correlated APIs or terminate receiving data from at least one currently cross correlated APIs. In various, the controller 118 may make such a determination based on performance data for the machine learning model, such as one or more of a historical performance of the machine learning model, a predicted statistical confidence in the machine learning model, or an actual predictive performance of the machine learning model.

At decision block 516, if the machine learning model of the business domain or the search engine domain is to receive data from one or more newly cross correlated APIs ("yes" at decision block 516), the process 500 may proceed to block 518. At block 518, the controller 118 may store information on a new cross correlation between a machine learning model identifier of the machine learning model in the business domain or the search engine domain and at least one API of a different domain of the business domain or the search engine domain when the machine learning model is newly configured to receive data from the at least one API. For example, the new cross correlation may be for a machine learning identifier of the machine learning model in the business domain to at least one API of the search engine domain, or vice versa.

However, if the machine learning model of the business domain or the search engine domain is not to receive data from one or more newly cross correlated APIs ("no" at decision block 516), the process 500 may proceed to decision block 520. At decision block 520, if the machine learning model of the business domain or the search engine domain is to terminate receiving data from one or more currently cross correlated APIs ("yes" at decision block 520), the process 500 may proceed to block 522.

At block 522, the controller 118 may delete information on an existing cross correlation between the machine learning model identifier of the machine learning model in the business domain or the search engine domain and one or more APIs of a different domain of the business domain or the search engine domain when the machine learning model is configured to terminate receiving data from the one or more APIs. For example, the termination may include terminating an existing cross correlation between a machine learning identifier of the machine learning model in the business domain and one or more APIs of the search engine domain, or vice versa.

Subsequently, the process 500 may loop back to block 514. However, if the machine learning model of the business domain or the search engine domain is not to terminate receiving data from one or more currently cross correlated APIs ("no" at decision block 520), the process 500 may also loop back to block 514.

Example Use Cases for High-Fidelity Data Management

There are many use cases for high-fidelity data management as a platform. Depending on the use case, different monetization models may be applied.

Improved Surfacing of Stores

In one use case, present search engines are known to not provide accurate recommendations. For example, a person looking for a coffee shop may be directed to a coffee shop further away than other sources of coffee. This may occur because the search engine is identifying outlets that specialize in coffee solely as candidates for surfacing. This ignores alternative general sources of coffee such as convenience stores.

By providing search engines with data directly from businesses with a full enumeration of services, search engines can then surface not just specialty stores, but also general stores. Examples of data to surface include not only the location and hours of availability of stores, but also an enumeration of services e.g., car washes, fuel/diesel, electric vehicle charging, alcohol, food, and the like.

Machine Learning Model Evolution Matching Data Evolution

Businesses are constantly collecting and changing the collection of data. Many businesses, such as consumer stores have independent mobile applications for users to crowdsource information. Accordingly, as different sources of data are collected as training data, the rules engine 328 enables data models to improve over time. In this way, machine learning models evolve as data quality evolves.

The administrator 312 will be aware of changes in the data sources. For example, initial data sources may solely be as received from search engines via search engine APIs 122. Then local business data stored in the data store 108 may be integrated into the training data. Finally, crowdsourced information as collected via mobile applications of users may further be integrated. The administrator 312 will be enabled by the rules engine 328 to determine which data to integrate and with which access privileges while ensuring positive data convergence.

White Labeling APIs

Because the controller 118 resides in the business domain 102 and is in full control of the enterprise 104, additional business APIs 120 that provide an amalgam of search engine data as exposed through search engine APIs 122 may be provided. An example may be a business API 120 that exposes recommendations based on a machine learning model comprised of both search engine domain 110 and business domain 102 data.

In other instances, simply sharing data from both the search engine domain 110 and business domain 102 in amalgamated sets through a business API 120 may also be done.

In cases where it is permitted to do so, the business domain 102 may expose its own APIs that pass-through search engine domain data. This practice is called white-labeling APIs. In this way, a partner of the enterprise 104 may have a single location and source of APIs.

Monetization

In some embodiments, the controller 118 functionality may be resold. The controller 118 may store a monitor that communicates with the administrative panel 310. The administrative panel 310 may include an application interface that provides access to business APIs 120, accesses to data in the data store 108, and accepted improvements to machine learning models via the rules engine 328. This data may further be stored in an independent data store called an access tracking data store (not shown).

With the data in the access tracking data store, a business may create monetization models to charge for the controller 118 functionality. The monetization models may include per access or alternatively subscription models. One of the key difficulties in monetization is in demonstrating value. Because the controller 118 stores improved performance of machine learning models via the data model history data store 326, not only can value be demonstrated, but also monetization models can be charged based on the extent of improvement if so desired.

While the embodiments of the high-fidelity data management are described above with respect to a business domain and a search engine domain, alternative embodiments of such high-fidelity data management may be applied to data management between two domains of other types.

Conclusion

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing any claims based on this disclosure.

What is claimed is:

1. One or more non-transitory computer-readable media storing computer-executable instructions that upon execution cause one or more processors to perform acts comprising:
    receiving an access request that includes a user account identifier from an application on a computing device requesting access to data stored in a data store of a business domain;
    determining based on a data access control list of the business domain whether a user account with the user account identifier has access to the data stored in the data store of the business domain that provides access to the data stored in the data store of the business domain;
    determining based on an application program interface (API) access control list of the business domain whether the user account with the user account identifier has access to one or more business APIs of the business domain that provides access to the data stored in the data store of the business domain; and
    in response to the user account with the user account identifier having access to the data stored in the data store of the business domain and the one or more business APIs of the business domain, selecting based on one or more data access privileges for the user account with the user account identifier a data view of multiple data views for viewing the data stored in the data store of the business domain and one or more data filters for application to the data, wherein the data stored in the data store of the business domain is provided to the application on the computing device via the one or more business APIs of the business domain.

2. The one or more non-transitory computer-readable media of claim 1, further comprising providing a data view of the data as filtered by the one or more data filters to the application on the computing device via the one or more business APIs of the business domain.

3. The one or more non-transitory computer-readable media of claim 1, further comprising in response to the user account with the user account identifier at least one of not having access to the data stored in the data store of the business domain or not having access to the one or more business APIs of the business domain, denying the application on the computing device access to the data stored in the data store of the business domain.

4. The one or more non-transitory computer-readable media of claim 1, wherein the acts further comprise:
    determining based on one or more privacy policies whether the data view for viewing the data stored in the data store of the business domain and the one or more data filters for filtering the data stored in the data store of the business domain are modified;
    in response to selecting an alternative data view for viewing the data and applying one or more alternative data filters to the data based on the one or more privacy policies, providing the alternative data view of the data as filtered by the one or more alternative data filters to the application on the computing device via the one or more business APIs of the business domain;
    in response to selecting the alternative data view for viewing the data without applying the one or more alternative data filters to the data based on the one or more privacy policies, providing the alternative data view of the data as filtered by the one or more data filters to the application on the computing device via the one or more business APIs of the business domain;

in response to the applying the one or more alternative data filters without the selecting of the alternative data view for viewing the data, providing the data view of the data as filtered by the one or more alternative data filters to the application on the computing device via the one or more business APIs of the business domain; and in response to not selecting the alternative data view for viewing the data and not applying the one or more alternative data filters to the data based on the one or more privacy policies, providing the data view of the data as filtered by the one or more data filters to the application on the computing device via the one or more business APIs of the business domain.

5. The one or more non-transitory computer-readable media of claim 1, wherein the data view is configured to provide a limited set of fields of the data for viewing by the application, and wherein the one or more data filters are configured to at least limit a number of data rows of the data provided to the application.

6. The one or more non-transitory computer-readable media of claim 1, wherein the data store of the business domain stores operational data and metadata related to one or more businesses.

7. The one or more non-transitory computer-readable media of claim 6, wherein the one or more businesses include at least one convenience store.

8. The one or more non-transitory computer-readable media of claim 1, wherein the user account identifier identifies a user account associated with a search engine domain.

9. The one or more non-transitory computer-readable media of claim 8, wherein the computing device is included in the search engine domain, and wherein the search engine domain includes a search engine that provides search results for a search based at least on the data provided to the computing device via the one or more business APIs.

10. The one or more non-transitory computer-readable media of claim 8, further comprising:
storing a plurality of machine learning model identifiers for machine learning models of the business domain in the data store of the business domain;
determining one or more corresponding search engine APIs of a plurality of search engine APIs used by each of the machine learning models of the business domain to receive data from the search engine domain; and
storing, in the data store, cross correlation information that cross correlates each of the plurality of machine learning model identifiers of the machine learning models with one or more search engine APIs based on the determining,
wherein attribute values in the data from the search engine domain that correspond to attribute values in the machine learning models of the business domain are used by the machine learning models of the business domain to generate predicted attributes related to the search engine domain.

11. The one or more non-transitory computer-readable media of claim 10, further comprising:
receiving an additional plurality of machine learning model identifiers for additional machine learning models of the search engine domain;
receiving additional cross correlation information that correlates the additional plurality of machine learning model identifiers with one or more corresponding business APIs of the business domain in which each of the additional machine learning models is configured to receive data from the business domain via the one or more corresponding business APIs; and
storing the additional plurality of machine learning model identifiers and the additional cross correlation information in the data store of the business domain,
wherein additional attribute values in the data from the business domain that correspond to additional attribute values in the machine learning models of the search engine domain are used by the machine learning models of the search engine domain to generate additional predicted attributes related to the business domain.

12. The one or more non-transitory computer-readable media of claim 11, further comprising:
storing information on a new cross correlation between a machine learning model identifier of a machine learning model in the business domain or the search engine domain and at least one API of a different domain of the business domain or the search engine domain when the machine learning model is newly configured to receive data from the at least one API; or
deleting information on an existing cross correlation between the machine learning model identifier of the machine learning model in the business domain or the search engine domain and one or more APIs of a different domain of the business domain or the search engine domain when the machine learning model is configured to terminate receiving data from the one or more APIs.

13. The one or more non-transitory computer-readable media of claim 12, wherein newly configuring the machine learning model to receive data from the at least one API or configuring the machine learning model to terminate receiving data from the one or more APIs is initiated based at least on one or more of a historical performance of the machine learning model, a predicted statistical confidence in the machine learning model, or an actual predictive performance of the machine learning model.

14. The one or more non-transitory computer-readable media of claim 12, wherein newly configuring the machine learning model to receive data from the at least one API or configuring the machine learning model to terminate receiving data from the one or more APIs is initiated by a user input that is inputted in response to a recommendation generated based on one or more of a historical performance of the machine learning model, a predicted statistical confidence in the machine learning model, or an actual predictive performance of the machine learning model.

15. A computer-implemented method, comprising:
storing, via one or more computing devices, a plurality of machine learning model identifiers for machine learning models of a first domain in a data store of the first domain;
determining one or more corresponding search engine APIs of a plurality of second domain APIs used by each of the machine learning models of the first domain to receive data from a second domain; and
storing, in the data store, cross correlation information that cross correlates each of the plurality of machine learning model identifiers of the machine learning models of the first domain with one or more second domain APIs based on the determining, wherein the machine learning models of the first domain are configured with attribute values that correspond to attribute values in the data from the second domain to generate predicted attributes related to the second domain.

16. The computer-implemented method of claim 15, further comprising:
receiving, via the one or more computing devices, an additional plurality of machine learning model identifiers for additional machine learning models of the second domain;
receiving, via the one or more computing devices, additional cross correlation information that correlates the additional plurality of machine learning model identifiers with one or more corresponding first domain APIs of the first domain, in which each of the one or more corresponding first domain APIs is configured to receive calls from the corresponding additional machine learning models and respond with data from the first domain; and
storing, via the one or more computing devices, the additional plurality of machine learning model identifiers and the additional cross correlation information in the data store of the first domain.

17. The computer-implemented method of claim 15, further comprising:
storing, via the one or more computing devices, information on a new cross correlation between a machine learning model identifier of a machine learning model in the first domain or the second domain and at least one API of a different domain of the first domain or the second domain when the machine learning model is newly configured to receive data from the at least one API; or
deleting, via the one or more computing devices, information on an existing cross correlation between the machine learning model identifier of the machine learning model in the first domain or the second domain and one or more APIs of a different domain of the first domain or the second domain when the machine learning model is configured to terminate receiving data from the one or more APIs.

18. The computer-implemented method of claim 17, wherein newly configuring the machine learning model to receive data from the at least one API or configuring the machine learning model to terminate receiving data from the one or more APIs is initiated based at least on one or more of a historical performance of the machine learning model, a predicted statistical confidence in the machine learning model, or an actual predictive performance of the machine learning model.

19. The computer-implemented method of claim 16, wherein the data from the first domain has additional attribute values that correspond to additional attribute values in the machine learning models of the second domain that generate additional predicted attributes related to the first domain.

20. A system, comprising:
one or more processors; and
memory including a plurality of computer-executable components that are executable by the one or more processors, the plurality of computer-executable components comprising:
an access management function component that controls access to data stored in a data store of a business domain by a user account associated with a search engine domain based on a user account access control list and an application program interface (API) access control list that controls access to business APIs of the business domain;
a data management function component that selects based on at least one of one or more data access privileges for the user account associated with the search engine domain or one or more privacy policies a data view of multiple data views for viewing the data stored in the data store of the business domain and one or more data filters for application to the data; and
an external API manager component that at least stores in the data store of the business domain cross correlation information that correlates a plurality of machine learning model identifiers of machine learning models of the search engine domain with one or more corresponding business APIs of the business domain in which each of the machine learning models is configured to receive data from the business domain via the one or more corresponding business APIs.

* * * * *